(12) United States Patent
Wang

(10) Patent No.: US 8,705,428 B2
(45) Date of Patent: Apr. 22, 2014

(54) METHOD FOR MULTIMEDIA BROADCAST AND MULTICAST SERVICE, MBMS, NOTIFICATION INDICATOR DETECTION, COMPUTER PROGRAM, AND USER EQUIPMENT APPARATUS

(75) Inventor: Xiaohui Wang, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 321 days.

(21) Appl. No.: 13/003,754

(22) PCT Filed: Jun. 23, 2009

(86) PCT No.: PCT/EP2009/057792

§ 371 (c)(1),
(2), (4) Date: Apr. 8, 2011

(87) PCT Pub. No.: WO2010/006892

PCT Pub. Date: Jan. 21, 2010

(65) Prior Publication Data

US 2011/0188440 A1 Aug. 4, 2011

Related U.S. Application Data

(60) Provisional application No. 61/082,299, filed on Jul. 21, 2008.

(30) Foreign Application Priority Data

Jul. 16, 2008 (EP) ..................... 08160513

(51) Int. Cl.
*H04W 4/06* (2009.01)
(52) U.S. Cl.
USPC ......... 370/312; 370/390; 370/432; 455/422.1
(58) Field of Classification Search
USPC ......... 370/310, 312, 328, 329, 390, 431, 432; 455/3.01, 3.04, 3.06, 450, 422.1
See application file for complete search history.

(56) References Cited

U.S. PATENT DOCUMENTS 8,300,593 B2 * 10/2012 Nielsen et al. ................ 370/331
(Continued)

FOREIGN PATENT DOCUMENTS

EP 1 608 196 A 12/2005
JP 2007-518340 A 7/2007
(Continued)

OTHER PUBLICATIONS

PCT International Search Report, dated Sep. 7, 2009, in connection with International Application No. PCT/EP2009/057792.

(Continued)

*Primary Examiner* — Steven H Nguyen
*Assistant Examiner* — Curtis A Alia
(74) *Attorney, Agent, or Firm* — Potomac Patent Group PLLC

(57) ABSTRACT

A method for multimedia broadcast and multicast service, MBMS, notification indicator detection from multiple MBMS notification-indication channel, MICH, frames in a User Equipment operating in a Wideband Code Division Multiple Access system is disclosed. The method comprises determining a desired number of MICH frames; upon connection with a NodeB, receiving an available number of MICH frames within a modification period; decoding notification indications of the received MICH frames; determining a majority value being the number of notification indications having a most frequent value of the decoded notification indications; and if a ratio between the majority value and the desired number of MICH frames is above a threshold value, determining the correct notification indicator to be the most frequent value, or if the ratio between the majority value and the desired number of MICH frames is less than the threshold value, connecting to the NodeB; receiving further MICH frames; and decoding notification indications of the received MICH frames such that the correct notification indicator is achieved. A computer program and a User Equipment apparatus are also disclosed.

14 Claims, 3 Drawing Sheets

(56) References Cited

U.S. PATENT DOCUMENTS

| | | | |
|---|---|---|---|
| 2005/0288040 A1* | 12/2005 | Charpentier et al. | 455/458 |
| 2006/0019641 A1* | 1/2006 | Vayanos et al. | 455/414.1 |
| 2006/0030342 A1* | 2/2006 | Hwang et al. | 455/466 |
| 2006/0128433 A1* | 6/2006 | Liang et al. | 455/560 |
| 2006/0274712 A1* | 12/2006 | Malladi et al. | 370/345 |
| 2008/0261582 A1* | 10/2008 | Sarkar et al. | 455/422.1 |

FOREIGN PATENT DOCUMENTS

| | | | |
|---|---|---|---|
| JP | 2007-522776 A | 8/2007 | |
| WO | 2005/079104 A | 8/2005 | |
| WO | 2007/148701 A1 | 12/2007 | |

OTHER PUBLICATIONS

PCT Written Opinion, dated Sep. 7, 2009, in connection with International Application No. PCT/EP2009/057792.

3GPP TS No. 25.346 "Introduction of the Multimedia Broadcast Multicast Service (MBMS) in the Radio Access Network (RAN)" V6.0.0, Mar. 1, 2004, pp. 1-50, XP002307039.

Samsung: "Reducing the false alarm probability on MICH decoding" 3GPP TSG WG2 MBMS Adhoc Meeting, Apr. 20, 2004, pp. 1-5, XP002508281.

Qualcomm Europe: "False alarm on MICH" 3GPP TSG RAN WG1 Meeting, May 10, 2004, pp. 1-3, XP002508282.

Japanese Office Action, dated May 13, 2013, in connection with counterpart Japanese Patent Application No. 2011-517843 (translation), all pages.

\* cited by examiner

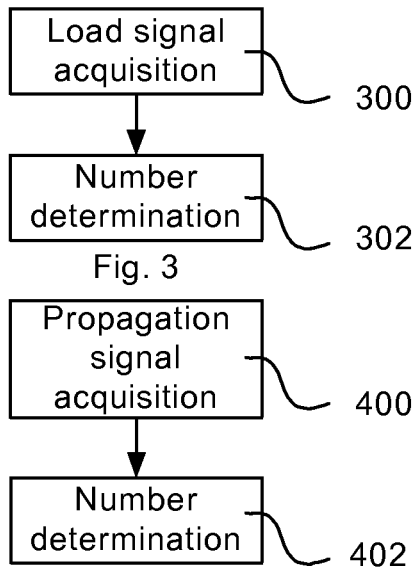
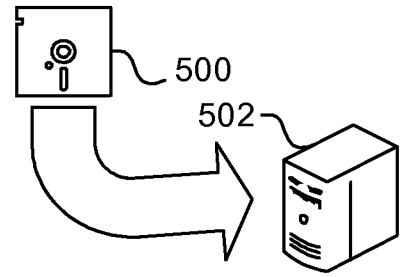
Fig. 5
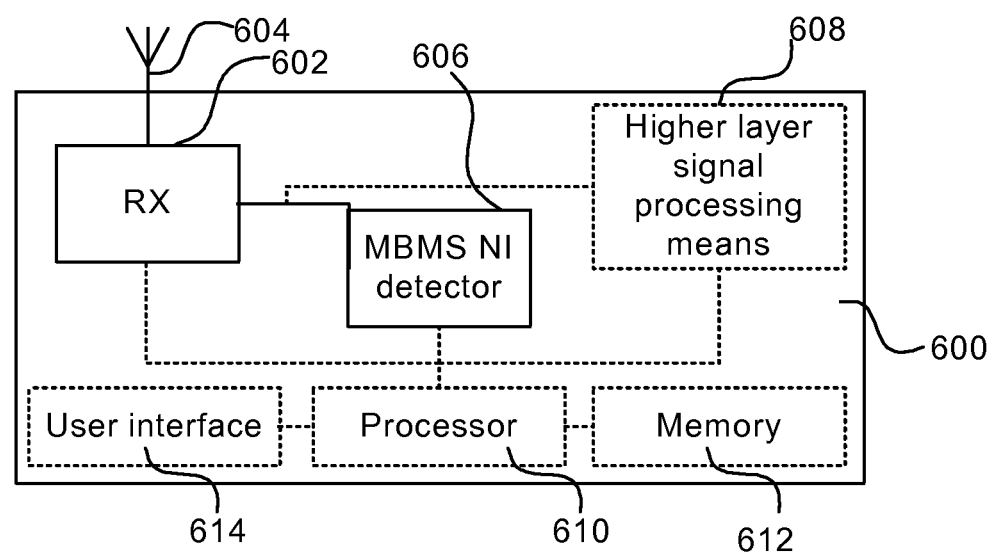
Fig. 6

METHOD FOR MULTIMEDIA BROADCAST AND MULTICAST SERVICE, MBMS, NOTIFICATION INDICATOR DETECTION, COMPUTER PROGRAM, AND USER EQUIPMENT APPARATUS

CROSS REFERENCE TO RELATED APPLICATIONS

This application claims priority under 35 U.S.C. §119 to European Patent Application No. EP. 08160513.1, filed on Jul. 16, 2008, which is hereby incorporated herein by reference in its entirety. This application also claims the benefit of U.S. Provisional Application No. 61/082,299, filed Jul. 21, 2008, which is hereby incorporated herein by reference in its entirety.

TECHNICAL FIELD

The present invention relates to a method for multimedia broadcast and multicast service, MBMS, notification indicator detection from multiple MBMS notification-indication channel, MICH, frames in a User Equipment operating in a Wideband Code Division Multiple Access system, a computer program for implementing the method, and a User Equipment apparatus.

BACKGROUND

A communication system, such as the Wideband Code Division Multiple Access (WCDMA) system described in documents from $3^{rd}$ Generation Partnership Project, may provide unicast, multicast, and/or broadcast services. The multicast service provides point-to-multipoint communication between a base station and a group of wireless devices, called User Equipment (UE) devices. A broadcast service provides point-to-multipoint communication between the base station and all UE devices within a certain broadcast area. Some examples of multicast and broadcast services are news, data, subscribed, and push-to-talk services. The broadcast and multicast services, called Multimedia Broadcast and Multicast Service (MBMS) may send data to the UE devices sporadically, periodically, or continuously.

The communication system preferably sends control information, configuration information, etc. for the MBMS supported by the system. The signaling is sent on a control channel called MBMS Control Channel (MCCH). A UE device receiving one or more services would then monitor the MCCH for signaling sent for the service(s) being received. The UE device may operate in an idle state whenever it is not actively exchanging data with one or more base stations in the system. In the idle state, the radio receiver with its path searcher and other power demanding means is mostly in an off state to save power, but the UE device wakes up periodically to receive e.g. paging messages from the system, and then again powers down as much circuitry as possible in the remaining time in order to conserve battery power.

In WCDMA, an MBMS Indicator Channel (MICH) is used to send MBMS notification indicators that indicate whether messages are being sent on the MCCH. The MCCH is carried in a Secondary Common Control Physical Channel (S-CCPCH). The messages sent on the MCCH contain information that allows the wireless devices to receive an MBMS Traffic Channel (MTCH). Such information may indicate, for example, which services are active, how to decode the MTCH, whether soft combining is possible, etc. The MTCH is a transport channel that carries traffic data or content for the services.

Each multicast/broadcast service is assigned specific notification indicators, which are set to '1' whenever messages are being sent on the MCCH for the service. Each UE device monitors the notification indicators for all of the services desired by the UE device. Whenever the notification indicator for any desired service is set, the UE device further processes the S-CCPCH to look for messages sent for that service.

Further, in WCDMA, a Page Indicator Channel (PICH) is used to send paging indicators to UE devices in idle state. The paging indicators for each idle wireless device indicate whether messages are being sent on a Paging Channel (PCH) for the UE device. The PCH is a transport channel that is also carried in the S-CCPCH. Each idle UE device monitors the PICH for its paging indicators. If these paging indicators are set to '1', then the wireless device processes the S-CCPCH to look for any messages sent for the wireless device. A key characteristic of indicator channels such as the PICH and MICH is that the information carried on these channels is short and un-coded and can thus be received and interpreted very quickly. Paging indicators for each idle wireless device are sent on the PICH in paging occasions for the wireless device. The notification indicators for each service are sent in each frame on the MICH and are set to the same notification value, either '1' or '0', for the entire modification period. The modification period may represent a time interval in which critical signaling information, which is information that is needed in order to receive MBMS content, may be changed.

The modification period is selected to be sufficiently long so that all UE devices can reliably detect at least one notification indicator sent on the MICH during the modification period. A wireless device with a Discontinuous Receiving (DRX) cycle that is shorter than the modification period can read the MICH during its paging occasion in each DRX cycle. A wireless device with a DRX cycle that is longer than the modification period can wake up between paging occasions to read the MICH. The modification period may be selected to be equal to or greater than a predetermined minimum duration so that wireless devices with long DRX cycles do not need to wake up too frequently. Depending on how the DRX cycle and the modification period are configured, a wireless device may be able to read one or multiple notification indicators for each desired service in each modification period.

In reality, there are some complications to achieve good performance of detecting the notification indicators. As in other wireless systems, there are always a risk of missing detections and get false alarms due to bad propagation conditions, low power in received signals, high interference, or high noise. In addition, there is a special issue with MICH detection; there is a risk for notification indicator collision when notification indicators from different MBMS services have overlapping positions in a MICH frame. It is therefore a desire to increase robustness in detection of notification indicators while keeping the power consumption low.

EP 1 608 196 A1 discloses a method for detecting notifications in a communication device. The method comprises the steps of successively receiving a finite set of notification indicators form a communication network, which in combination represent a notification identifier associated with the device; subsequently checking each received notification indicator whether it is positive or negative; determining, after each checked notification indicator and based on the checked notification indicators, whether to proceed with the next notification indicator or to decide on a presence of a notification for the predetermined notification indicator; and, if it is determined that a decision is to be made, interrupting the checking of notification before all notification indicators of the set have been checking and deciding, based on the checked notification indicators, whether a notification for the predetermined notification identifier is assumed to be present or not.

SUMMARY

An object of the invention is to at least alleviate the above stated problem. The solution is based on the understanding that if several MICH frames are read and processed, the correct notification indications of the MBMS update can be obtained more accurately.

According to a first aspect, there is provided a method for multimedia broadcast and multicast service, MBMS, notification indicator detection from multiple MBMS notification-indication channel, MICH, frames in a User Equipment operating in a Wideband Code Division Multiple Access system. The method comprises determining a desired number of MICH frames; upon connection with a NodeB, receiving an available number of MICH frames within a modification period; decoding notification indications of the received MICH frames; determining a majority value being the number of notification indications having a most frequent value of the decoded notification indications. If a ratio between the majority value and the desired number of MICH frames is above a threshold value, the method determines the correct notification indicator to be the most frequent value. If the ratio between the majority value and the desired number of MICH frames is less than the threshold value, the method proceeds by connecting to the NodeB; receiving further MICH frames; and decoding notification indications of the received MICH frames such that the correct notification indicator is achieved.

The determining of a desired number of MICH frames may comprise acquiring a load signal representative of the load of the serving cell; and determining the number based on the load signal.

The determining of a desired number of MICH frames may comprise acquiring a propagation signal representative of propagating conditions of received transmissions from a path searcher of the User Equipment; and determining the number based on the propagation signal.

The method may be performed when the User Equipment is in idle mode.

The decoding of notification indications may be performed at least partly after reception of the MICH frames when the User Equipment has returned to a radio sleep mode of the idle mode.

The threshold may be ½.

The number of further received MICH frames may be the desired number of MICH frames minus a product of the number of MICH frames per paging indicator occasion and the number of paging indicator occasions per modification period if all the paging occasions within a modification period are passed.

According to a second aspect, there is provided a computer program comprising instructions which when executed by a processor cause the processor to perform the method according to the first aspect.

According to a third aspect, there is provided a User Equipment apparatus arranged to operate in a Wideband Code Division Multiple Access system, comprising a radio receiver and a multimedia broadcast and multicast service, MBMS, notification indicator detector arranged to detect a notification detector from multiple MBMS notification-indication channel, MICH, frames, wherein the MBMS notification indicator detector is arranged to determine a desired number of MICH frames; upon the radio receiver receiving transmissions from a NodeB, receive an available number of MICH frames within a modification period; decode notification indications of the received MICH frames; determine a majority value being the number of notification indications having a most frequent value of the decoded notification indications; and if a ratio between the majority value and the desired number of MICH frames is above a threshold value, determine the correct notification indicator to be the most frequent value, or if the ratio between the majority value and the desired number of MICH frames is above a threshold value is less than the threshold value, cause the radio receiver to start receiving transmissions from the NodeB; receive further MICH frames; and decode notification indications of the received MICH frames such that the correct notification indicator is achieved.

The determination of a desired number of MICH frames may be based on a load signal representative of the load of the serving cell.

The determination of a desired number of MICH frames may be based on a propagation signal representative of propagating conditions of received transmissions from a path searcher of the radio receiver.

The notification indicator detector may be arranged to be operated when the User Equipment is in idle mode, and arranged to decode the notification indications at least partly after reception of the MICH frames when the User Equipment has returned to a radio sleep mode of the idle mode.

The threshold may be ½.

The number of further received MICH frames may be the desired number of MICH frames minus a product of the number of MICH frames per paging indicator occasion and the number of paging indicator occasions per modification period if all the paging occasions within a modification period are passed.

BRIEF DESCRIPTION OF DRAWINGS

FIG. 3 is a flow chart illustrating determination of the desired number of MICH frames according to an embodiment.

FIG. 4 is a flow chart illustrating determination of the desired number of MICH frames according to an embodiment.

FIG. 5 schematically illustrates a computer-readable medium.

FIG. 6 is a block diagram schematically illustrating a UE apparatus

DETAILED DESCRIPTION

If several MICH frames are read and processed, the correct notification indications of the MBMS update can be obtained more accurately. In order to enhance quality of notification indicator detection, an algorithm based on multiple MICH frames can be applied. A basic approach can be to decode notification indicators for a given MICH over several consecutive MICH frames, and consider that a change of MCCH is present for the next modification period if the majority of the decoded notification indicators are positive, else, the notification indicator is considered negative for the MICH. This simple approach may work well for a UE device that is in connected mode, i.e. when the radio receiver of the UE is in an on state and not switched off for DRX. For the idle mode of the UE, this approach would be too power consuming to be efficient since the radio have to be in on-state for all the desired frames.

Considering the idle mode in practice, the UE wakes up, i.e. sets the radio to an on-state, including running path searcher and frequency correction functions to be able to receive reliable data, at certain occasions for certain inevitable UE activities, such as checking paging information. At those occasions, it is preferable that MICH frames are received such that notification indicators can be decoded. For such occasions, a notification indicator detection method, as will now be described for different embodiments with reference to FIGS. 1 to 4, is employed.

Figure 1:
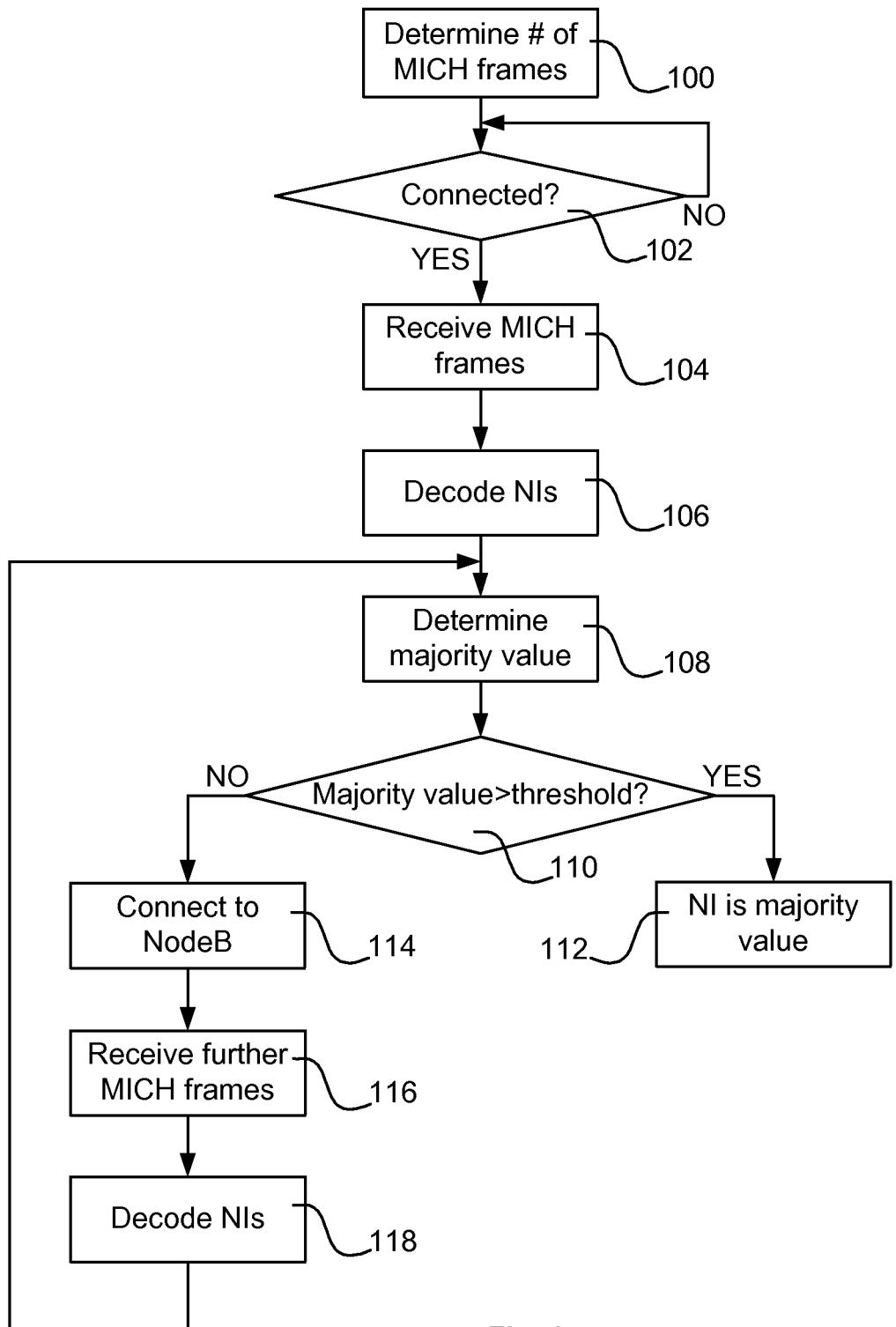
FIG. 1 is a flow chart illustrating a method for MBMS notification indicator detection from multiple MICH frames in a UE operating in a WCDMA system according to an embodiment.

FIG. 1 is a flow chart illustrating a method for MBMS notification indicator detection from multiple MICH frames in a UE operating in a WCDMA system. In a number of desired MICH frames determination step 100, it is determined how many MICH frames that is desired to form base for the detection of the notification indicator (NI). This can be determined from one or more parameters, as will be further elucidated with reference to FIGS. 3 and 4. In a connection checking step 102, it is checked whether the UE has its radio up and running for some other activities. If not, the UE waits until the radio is on. If the radio is on, the UE receives the determined number of MICH frames, if that is possible, or if that is not possible, as many MICH frames as possible in a MICH frame reception step 104. The received MICH frames are processed to decode their NIs in an NI decoding step 106. The decoded NIs are examined to determine which NI value, i.e. "1" or "0", or positive or negative, that is in majority, and how many of the decoded NIs that had this value in a majority value determination step 108, wherein a majority value stating the occurrences of the NI value that it in majority. It is checked in a comparison step 110 whether the majority value is above a threshold. The threshold is preferably a ratio between the majority value and the determined number of MICH frames desired for NI detection, i.e. the number determined in step 100. The ratio can for example be ½, but can also be chosen for another degree of certainty of the correct NI, e.g. ¼, ⅓, ⅔, ¾. The ratio can also be based on a statistical model, wherein the threshold is determined by a quantile of a statistical function of the statistical model.

If the ratio is above the threshold, the detected NI is defined as the NI value in majority as above in a NI definition step 112. If the ratio is below the threshold, the UE is caused to connect to the NodeB of the WCDMA system in a connection step 114, and receive further MICH frames in a further reception step 116. The number of further received MICH frames can be the desired number of MICH frames minus a product of the number of MICH frames per paging indicator occasion and the number of paging indicator occasions per modification period if all the paging occasions within a modification period are passed. The further received NIs are then decoded in an NI decoding step 118 such that a proper majority value can be determined, and thus NI be defined and thus detected. The proper majority value can be found in a similar way as described above for determining the threshold, i.e. to achieve a desired degree of certainty. Thus, certain levels defined by constants or determined by statistical models can be used.

Figure 2:
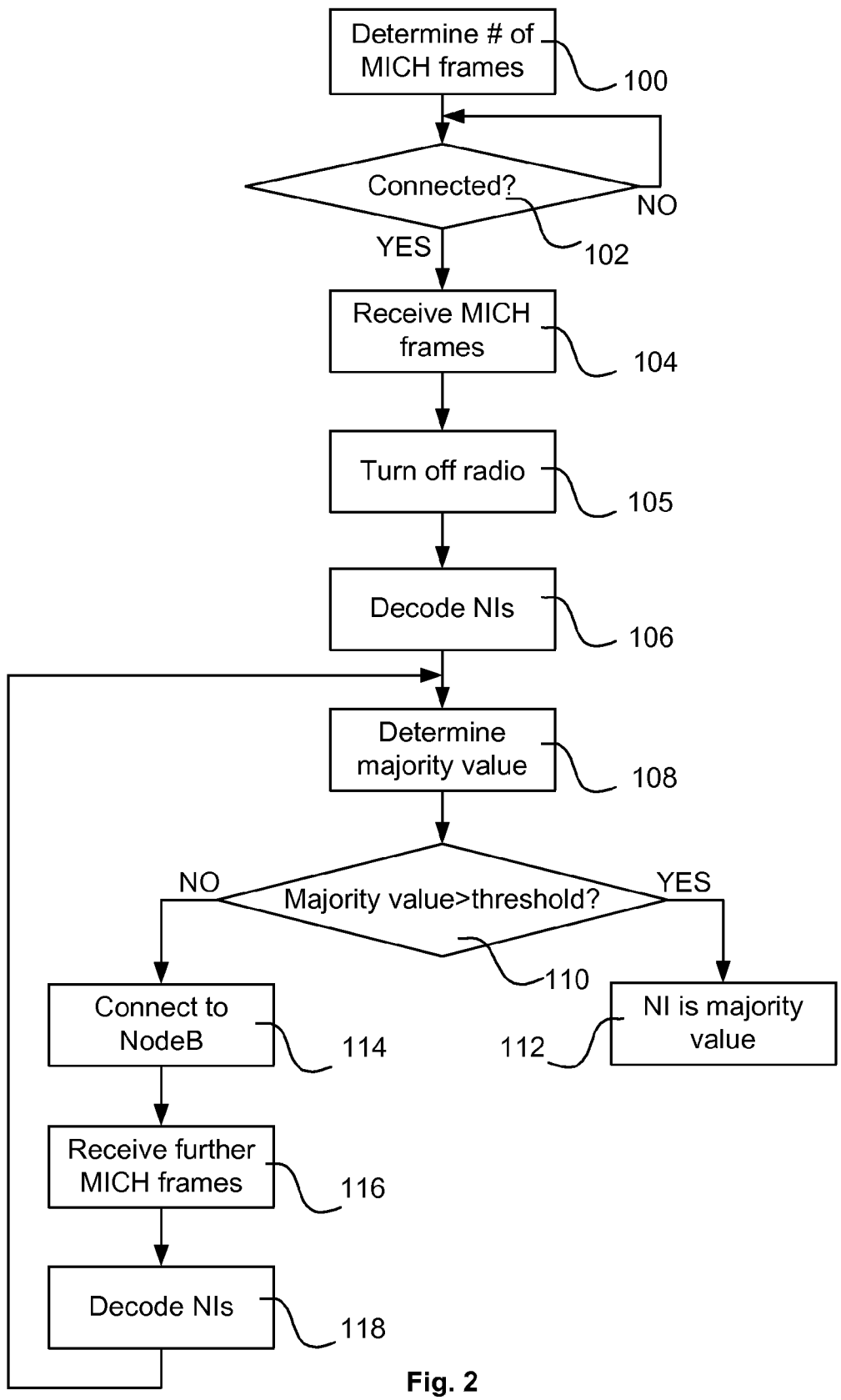
FIG. 2 is a flow chart illustrating a method for MBMS notification indicator detection from multiple MICH frames according to an embodiment.

FIG. 2 is a flow chart illustrating a method for MBMS notification indicator detection from multiple MICH frames similar to the one demonstrated with reference to FIG. 1, whereby equal reference signs are used for equal actions. The method according to the embodiment of FIG. 2 has the feature that the radio is shut off as fast as possible, which is enabled by shutting off the radio in a radio shut-off step 105, which is performed before decoding the NIs in the NI decoding step 106. This enables further power savings, since the communication apparatus then can do the signal processing also when the radio is off. Other features of this embodiment are similar to the one demonstrated with reference to FIG. 1.

FIG. 3 is a flow chart illustrating determination of the desired number of MICH frames. In a load signal acquisition step 300, a load signal representative of the load of the serving cell is acquired. This can be done from previously gained information from the serving cell. Based on the load signal, and possibly other signals, the number of desired MICH frames is determined in a number determination step 302.

FIG. 4 is a flow chart illustrating determination of the desired number of MICH frames. In a propagation signal acquisition step 400, a propagation signal representative of the propagation conditions of the received transmissions is acquired. This can be done from a path searcher of the radio receiver of the UE. Based on the propagation signal, and possibly other signals, such as the load signal, the number of desired MICH frames is determined in a number determination step 402.

The methods according to the present invention are suitable for implementation with aid of processing means, such as computers and/or processors. Therefore, there is provided computer programs, comprising instructions arranged to cause the processing means, processor, or computer to perform the steps of any of the methods according to any of the embodiments described with reference to any of FIGS. 1 to 4. The computer programs preferably comprise program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to any of FIGS. 1 to 4. The computer 502 and computer program product 500 can be arranged to execute the program code sequentially where actions of the any of the methods are performed stepwise, but can also be arranged to perform the actions on a real-time basis, i.e. actions are performed upon request and/or available input data. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

FIG. 6 is a block diagram schematically illustrating a UE apparatus 600. The UE apparatus 600 comprises a receiver 602 comprising receiving circuitry, which down-converts and demodulates a WCDMA transmission received via one or more antennas 604, and outputs demodulated signals. A MBMS NI detector 606 of the UE 600 is arranged to perform the actions according to any of the embodiments described with reference to any of FIGS. 1 to 4, which can be implemented as described with reference to FIG. 5. The communication apparatus 600 can be a mobile telephone, a communication card in a computer, or any other apparatus arranged to perform communications in an WCDMA communication system. The receiver 602 also provides its output to higher layer signal processing means 608 of the communication apparatus 600. The communication apparatus 600 preferably further comprises a processor 610 arranged to control operations of the communication apparatus 600. The processor 610 preferably works with aid of a memory 612, which is arranged to store and provide work and/or content data. Optionally, if the communication apparatus 600 is an apparatus to be operated directly by a user, such as a mobile phone, the communication apparatus 600 can comprise a user interface 614, which can comprise input and output means such as microphone, speaker, display screen, keys, joystick, touchpad, touch sensitive screen, etc.

The invention claimed is:

1. A method for multimedia broadcast and multicast service, MBMS, notification indicator detection from multiple MBMS notification-indication channel, MICH, frames in a User Equipment operating in a Wideband Code Division Multiple Access system, the method comprising:
   determining a desired number of MICH frames;
   upon connection with a NodeB, receiving an available number of MICH frames within a modification period;
   decoding notification indications of the received MICH frames;
   determining a majority value being the number of notification indications having a most frequent value of the decoded notification indications; and
   if a ratio between the majority value and the desired number of MICH frames is above a threshold value, determining the correct notification indicator to be the most frequent value; or
   if the ratio between the majority value and the desired number of MICH frames is less than the threshold value, connecting to the NodeB;
   receiving further MICH frames; and
   decoding notification indications of the received MICH frames such that the correct notification indicator is achieved with a desired degree of certainty.

2. The method according to claim 1, wherein the determining of a desired number of MICH frames comprises:
   acquiring a load signal representative of the load of the serving cell; and
   determining the number based on the load signal.

3. The method according to claim 1, wherein the determining of a desired number of MICH frames comprises:
   acquiring a propagation signal representative of propagating conditions of received transmissions from a path searcher of the User Equipment; and
   determining the number based on the propagation signal.

4. The method according to claim 1, being performed when the User Equipment is in idle mode.

5. The method according to claim 4, wherein the decoding of notification indications is performed at least partly after reception of the MICH frames when the User Equipment has returned to a radio sleep mode of the idle mode.

6. The method according to claim 1, wherein the threshold is ½.

7. The method according to claim 1, wherein the number of further received MICH frames is the desired number of MICH frames minus a product of the number of MICH frames per paging indicator occasion and the number of paging indicator occasions per modification period if all the paging occasions within a modification period are passed.

8. A non-transitory computer storage medium having stored therein a computer program comprising instructions which, when executed by a processor, caused the processor to perform a method for multimedia broadcast and multicast service, MBMS, notification indicator detection from multiple MBMS notification-indication channel, MICH, frames in a User Equipment operating in a Wideband Code Division Multiple Access system, the method comprising:
   determining a desired number of MICH frames;
   upon connection with a NodeB, receiving an available number of MICH frames within a modification period;
   decoding notification indications of the received MICH frames;
   determining a majority value being the number of notification indications having a most frequent value of the decoded notification indications; and
   if a ratio between the majority value and the desired number of MICH frames is above a threshold value, determining the correct notification indicator to be the most frequent value; or
   if the ratio between the majority value and the desired number of MICH frames is less than the threshold value, connecting to the NodeB;
   receiving further MICH frames; and
   decoding notification indications of the received MICH frames such that the correct notification indicator is achieved with a desired degree of certainty.

9. A User Equipment apparatus arranged to operate in a Wideband Code Division Multiple Access system, comprising a radio receiver and a multimedia broadcast and multicast service, MBMS, notification indicator detector arranged to detect a notification detector from multiple MBMS notification-indication channel, MICH, frames, wherein the MBMS notification indicator detector is arranged to:
   determine a desired number of MICH frames;
   upon the radio receiver receiving transmissions from a NodeB, receive an available number of MICH frames within a modification period; and
   decode notification indications of the received MICH frames, wherein the MBMS notification indicator detector is further arranged to:
   determine a majority value being the number of notification indications having a most frequent value of the decoded notification indications; and
   if a ratio between the majority value and the desired number of MICH frames is above a threshold value, determine the correct notification indicator to be the most frequent value; or
   if the ratio between the majority value and the desired number of MICH frames is less than the threshold value, cause the radio receiver to start receiving transmissions from the NodeB;
   receive further MICH frames; and
   decode notification indications of the received MICH frames such that the correct notification indicator is achieved with a desired degree of certainty.

10. The apparatus according to claim 9, wherein the determination of a desired number of MICH frames is based on a load signal representative of the load of the serving cell.

11. The apparatus according to claim 9, wherein the determination of a desired number of MICH frames is based on a propagation signal representative of propagating conditions of received transmissions from a path searcher of the radio receiver.

12. The apparatus according to claim 9, wherein the notification indicator detector is arranged to be operated when the User Equipment is in idle mode, and arranged to decode the notification indications at least partly after reception of the MICH frames when the User Equipment has returned to a radio sleep mode of the idle mode.

13. The apparatus according to claim 9, wherein the threshold is ½.

14. The apparatus according to claim 9, wherein the number of further received MICH frames is the desired number of MICH frames minus a product of the number of MICH frames per paging indicator occasion and the number of paging indicator occasions per modification period if all the paging occasions within a modification period are passed.

* * * * *